(12) United States Patent
Redekop

(10) Patent No.: US 9,949,432 B2
(45) Date of Patent: Apr. 24, 2018

(54) LAND ROLLER WITH CHOPPING BLADES

(71) Applicant: Johan Redekop, Winkler (CA)

(72) Inventor: Johan Redekop, Winkler (CA)

( * ) Notice: Subject to any disclaimer, the term of this patent is extended or adjusted under 35 U.S.C. 154(b) by 0 days.

(21) Appl. No.: 15/209,391

(22) Filed: Jul. 13, 2016

(65) Prior Publication Data

US 2017/0127610 A1    May 11, 2017

Related U.S. Application Data

(60) Provisional application No. 62/250,141, filed on Nov. 3, 2015.

(51) Int. Cl.
*A01D 34/52* (2006.01)
*A01B 73/06* (2006.01)
*A01D 34/44* (2006.01)
*A01D 101/00* (2006.01)

(52) U.S. Cl.
CPC ............ *A01D 34/52* (2013.01); *A01B 73/067* (2013.01); *A01D 34/44* (2013.01); *A01D 2101/00* (2013.01)

(58) Field of Classification Search
CPC ....... A01B 29/042; A01B 29/04; A01B 29/06; A01D 34/52
USPC ......................................... 172/122, 554, 540
See application file for complete search history.

(56) References Cited

U.S. PATENT DOCUMENTS

| 461,309 | A | * | 10/1891 | Blue | A01B 33/103 172/540 |
|---|---|---|---|---|---|
| 773,088 | A | * | 10/1904 | Mize | A01B 33/103 172/540 |
| 1,512,596 | A | * | 10/1924 | Hamshaw | A01B 33/00 172/116 |
| 1,543,515 | A | * | 6/1925 | Pickard | A01B 33/103 172/540 |
| 1,566,471 | A | * | 12/1925 | Fretts | A01B 29/06 172/532 |
| 1,578,752 | A | * | 3/1926 | Moeller | A01B 29/06 172/611 |
| 1,887,818 | A | * | 11/1932 | Michalka | A01D 34/52 172/241 |
| 2,663,131 | A | * | 12/1953 | Johnson | A01B 39/18 172/554 |
| 2,870,850 | A | * | 1/1959 | Dethlefsen | A01B 29/045 172/554 |
| 3,104,723 | A | * | 9/1963 | Skalka | A01B 9/003 172/122 |
| 4,090,570 | A | * | 5/1978 | Alexander | A01G 23/093 172/116 |
| 4,585,076 | A | * | 4/1986 | Stevens | A01B 63/16 172/240 |
| 5,953,895 | A | | 9/1999 | Hobbs | |

(Continued)

*Primary Examiner* — Matthew D. Troutman
(74) *Attorney, Agent, or Firm* — Ryan W. Dupuis; Ade + Company Inc; Kyle R. Satterthwaite

(57) ABSTRACT

A vegetation chopping roller for an agricultural land roller implement including a drum body having an outer periphery which is generally cylindrical about a drum axis of rotation and a plurality of protruding mounting flanges upon which chopping blades are mounted using threaded fasteners. A seating surface is fixedly supported in relation to the drum body in association with each blade which receives the inner edge of the associated blade abutted thereon such that the threaded fasteners are substantially isolated from shear forces by the abutment of the blades with the seating surfaces.

14 Claims, 3 Drawing Sheets

(56) References Cited

U.S. PATENT DOCUMENTS 6,539,697 B2     4/2003   Burk
7,562,517 B1 *   7/2009   Kornecki ............... A01B 29/04
                                                 172/554

\* cited by examiner

LAND ROLLER WITH CHOPPING BLADES

This application claims the benefit under 35 U.S.C.119(e) of U.S. provisional application Ser. No. 62/250,141, filed Nov. 3, 2015.

FIELD OF THE INVENTION

The present invention relates to an agricultural land roller for being supported on a land roller implement alone or with additional land rollers in which each land roller comprises a drum body supported for rolling movement along the ground. More particularly the present invention relates to a land roller having a drum body that further includes chopping blades protruding radially therefrom for crushing and/or chopping agricultural plant residue including plant stalks and the like.

BACKGROUND

Land roller implements are known to be used in agriculture for levelling land, pushing rocks down into the soil, breaking up soil mounds and clods, or packing seed for example. A typical land roller includes a plurality of frame sections, each supporting at least one roller thereon. The roller may be a steel drum, a series of packer wheels or any other rolling packing element.

In some instances, it is known to provide a land roller implement in which the drum body of each roller is provided with a plurality of radially protruding chopping blades intended for breaking, crushing, and/or chopping the plant residue or stubble remaining in a farm field following the crop harvest. Examples of stubble choppers are described in U.S. Pat. No. 2,533,356 by Cady and U.S. Pat. No. 6,539,697 by Burk. In each instance, the blades are not suitably arranged for quick and ready replacement on the peripheral surface of the drum body in the event of damage, or for sharpening for example.

U.S. Pat. No. 5,953,895 by Hobbs discloses another example of a land roller implement having roller comprising a drum body supporting radially protruding chopping blades thereon, in which the chopping blades are readily releasable from the drum body by being bolted to respective mounting flanges protruding radially from the peripheral surface of the drum body. As shown in FIG. 2 of Hobbs, each blade 22 is supported on a mounting flange. In order to provide proper support to the blades to prevent shearing of the bolts as the blades impact the ground during rolling motion, the blades must be butted up against the outer peripheral surface of the drum. This does not allow for the leading face of the mounting flange to be welded to the drum surface as the weld bead would interfere with abutment of the blade with the peripheral drum surface as shown in attached FIGS. 2 and 3 of the current specification. Elimination of a weld along the front face as in attached FIG. 2 would cause the mounting plates to readily fold back against the drum as the roller is displaced along the ground, thus necessitating the use of rear braces supporting each mounting flange. Without braces, the leading face of the mounting flanges must be welded to the drum surface, however, the weld bead would interfere with abutment of the blade against the outer surface of the drum as shown in attached FIG. 3 of the current specification such that the bolts are not isolated from shear forces and tend to break as the blades impact the ground in this instance.

SUMMARY

According to one aspect of the present invention there is provided a land roller implement arranged to be towed in a forward working direction by a towing vehicle for chopping vegetation on the ground, the implement comprising:

a main frame arranged for connection to the towing vehicle; and at least one ground roller supported on the main frame for rotation about a drum axis oriented transversely to the forward working direction so as to be arranged for rolling movement across the ground, said at least one ground roller comprising:

a drum body having an outer periphery which is generally cylindrical about the drum axis;

a plurality of mounting flanges supported on the drum body so as to extend generally in an axial direction of the ground roller and so as to protrude generally radially outward from the outer periphery of the drum body;

a plurality of blades supported on the mounting flanges respectively such that each blade extends radially outwardly from an inner edge to an outer edge which is spaced radially outwardly in relation to the respective mounting flange; and at least one seating surface fixedly supported in relation to the drum body in association with each blade so as to be oriented transversely to the associated blade at a location spaced radially outwardly from the outer periphery of the drum body;

said at least one seating surface receiving the inner edge of the associated blade abutted thereon.

By providing a seating surface associated with each mounting flange supporting a blade thereon which is raised relative to the peripheral surface of the drum, each mounting flange can be welded to the peripheral surface of the drum at both leading and trailing sides thereof without interfering with the blades being butted up against a secure surface to isolate the bolts from shear forces.

According to another aspect there is provided a ground roller for being supported on a land roller implement for chopping vegetation on the ground, the land roller implement having a main frame arranged for connection to a towing vehicle for movement in a forward working direction with the towing vehicle, the ground roller comprising:

a drum body having an outer periphery which is generally cylindrical about a drum axis and being arranged to be supported on the main frame for rotation relative to the main frame about the drum axis in which the drum axis is oriented transversely to the forward working direction for rolling movement across the ground in the forward working direction;

a plurality of mounting flanges supported on the drum body so as to extend generally in an axial direction of the ground roller and so as to protrude generally radially outward from the outer periphery of the drum body;

a plurality of blades supported on the mounting flanges respectively such that each blade extends radially outwardly from an inner edge to an outer edge which is spaced radially outwardly in relation to the respective mounting flange; and at least one seating surface fixedly supported in relation to the drum body in association with each blade so as to be oriented transversely to the associated blade at a location spaced radially outwardly from the outer periphery of the drum body;

said at least one seating surface receiving the inner edge of the associated blade abutted thereon.

The ground roller in this instance can be manufactured as a replacement roller for mounting in place of a conventional roller on a variety of different land roller implements. A land roller with a smooth cylindrical drum body for levelling land can thus be modified for use in crimping or chopper stubble for example.

The blades are preferably releasably secured to the mounting flanges by threaded fasteners, in which the threaded fasteners are substantially isolated from shear forces by abutment of the blades with the seating surfaces.

The blades are preferably supported on leading faces of the respective mounting flanges.

Preferably each seating surface is oriented i) tangentially to a peripheral surface of the drum body, ii) perpendicularly to the associated blade, and/or iii) perpendicularly to the mounting flange or the mounting flanges associated therewith.

Each blade may be abutted against a plurality of seating surfaces at axially spaced apart positions along the drum body.

Preferably at least some of the mounting flanges supporting the blades thereon are welded to a peripheral surface of the drum body at a leading face and at a trailing face of the mounting flange.

Preferably a leading face of at least some of the mounting flanges are welded to a peripheral surface of the drum body at a plurality of axially spaced apart weld locations.

Some of the seating surfaces may be located at seat locations which are between respective ones of the weld locations in an axial direction of the drum body.

Some embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
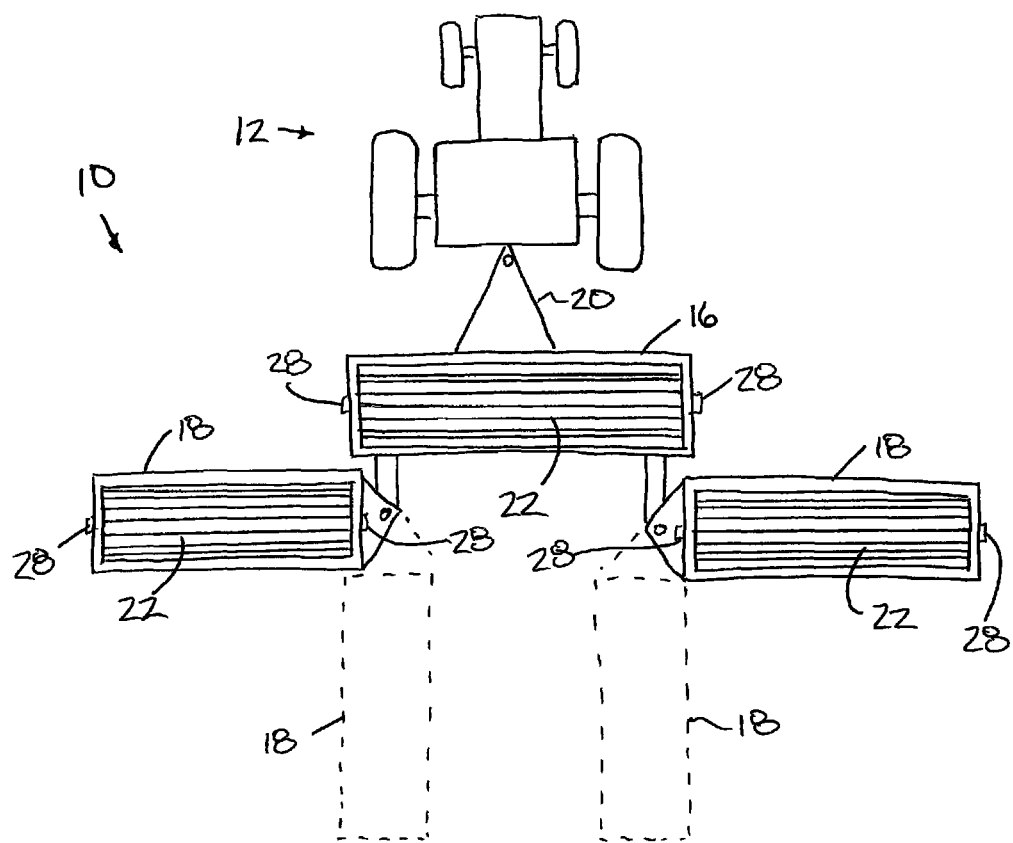
FIG. 1 is a plan view of a land roller implement with rollers having radially protruding blades thereon.
Figure 2:
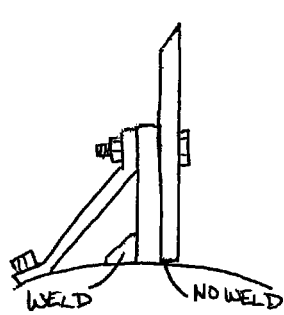
FIG. 2 is an end view of the protruding blade according to one embodiment of a prior art roller.
Figure 3:
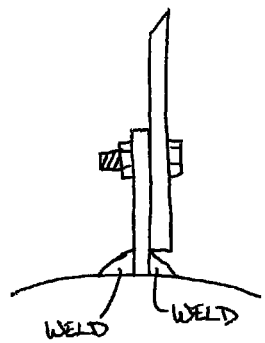
FIG. 3 is an end view of the protruding blade according to a second embodiment of a prior art roller.
Figure 4:
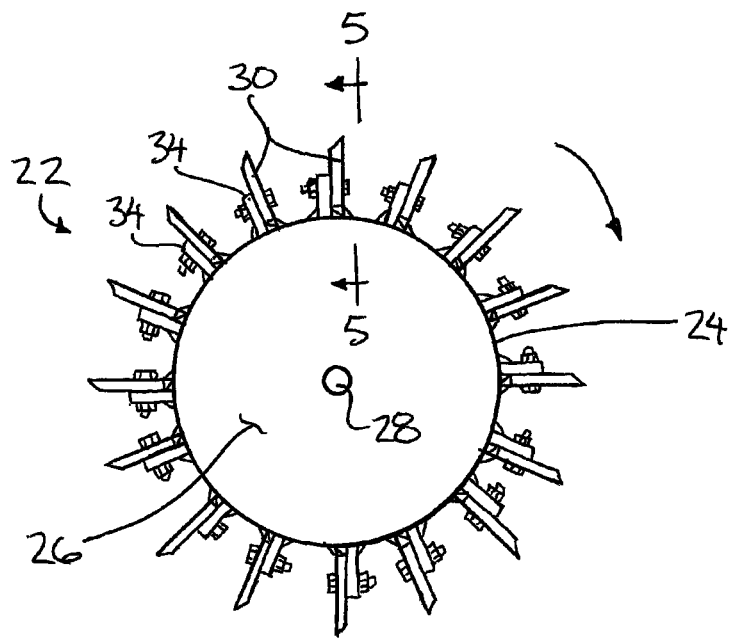
FIG. 4 is an end view of one of the rollers according to the implement of FIG. 1.
Figure 5:
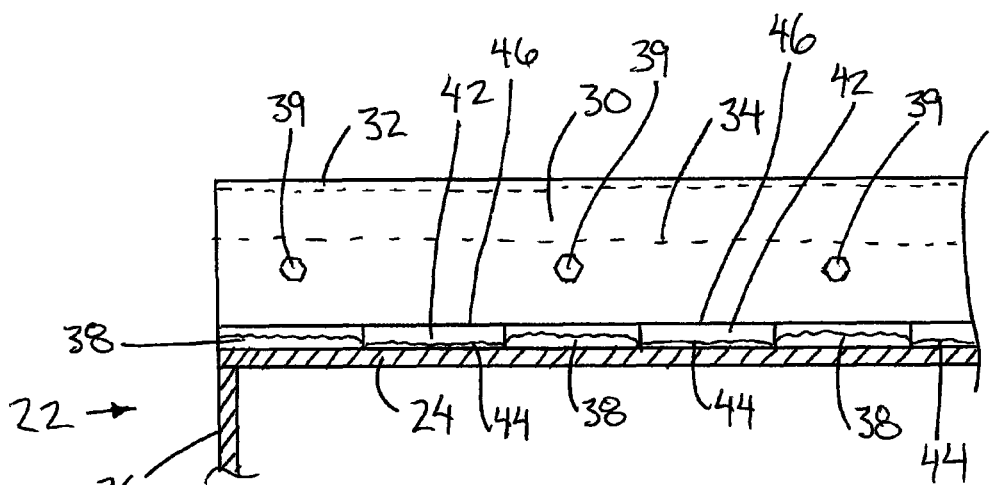
FIG. 5 is an elevational view along the line 5-5 in FIG. 4.
Figure 6:
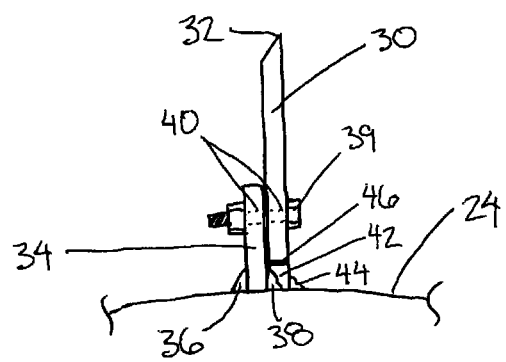
FIG. 6 is an enlarged end view of one of the blades of the roller according to FIG. 4.
Figure 7:
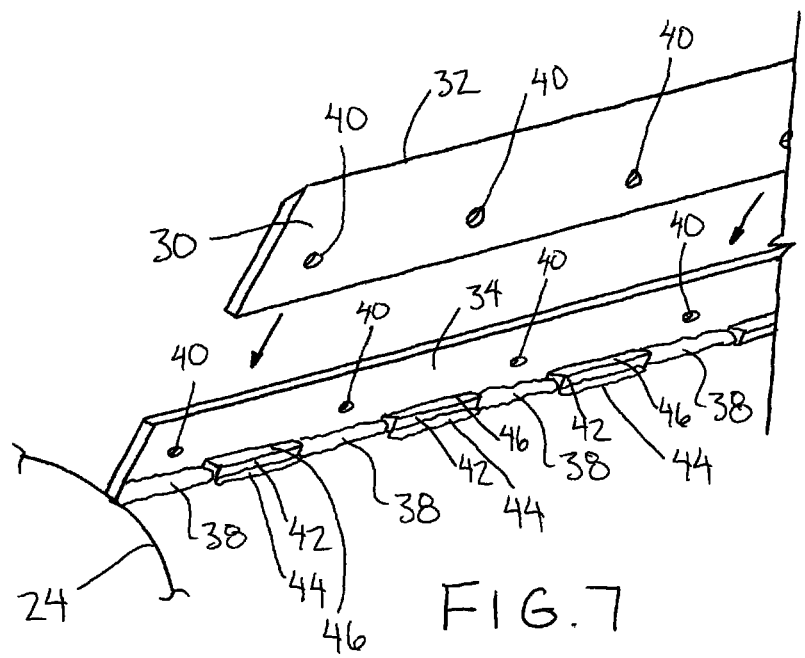
FIG. 7 is a perspective view of one of the blades shown separated from the respective mounting flange fixed to the peripheral surface of the drum body according to the implement of FIG. 1.

Referring to the accompanying drawings, there is illustrated a land roller implement generally indicated by reference numeral 10. The implement 10 is suited for connection to a towing vehicle 12, for example an agricultural tractor, for rolling movement across the ground.

The implement 10 includes a main frame including a centre section 16 and two wing sections 18 pivotally coupled at laterally opposing sides of the centre section 16. A hitch arm 20 protrudes forwardly from the centre section 16 for connection to the towing vehicle 12. The two wing sections 18 are foldable relative to the working section between a working position shown in solid line in FIG. 1 in which the wing sections extend laterally outwardly in laterally opposing directions from opposing ends of the centre section 16, and a transport position shown in broken line in FIG. 1 in which the two wing sections extend generally rearwardly from the laterally opposing ends of the centre section.

Each section of the frame supports a respective roller 22 thereon which is arranged for rolling movement in the forward direction of the towing vehicle in the working position. Each roller 22 comprises a drum body having an outer peripheral wall 24 which is generally cylindrical about a central drum axis of the body. Circular end walls 26 enclose the laterally opposing ends of each drum body. A shaft portion 28 protrudes axially outward from each of the two opposing end walls 26 at the drum axis for rotatable coupling to the respective section of the frame upon which the roller is supported. Each roller is thus arranged for rolling movement along the ground about the drum axis thereof as the frame is towed forwardly together with the towing vehicle by orienting the rollers in the working position so that the drum axes are perpendicular to the forward working direction of the towing vehicle.

Each roller 22 further includes a plurality of blades 30 which protrude radially outward from the outer wall 24 of the drum body at evenly spaced positions in the circumferential direction about the full circumference of the drum body. Each blade extends axially the full length of the drum body so as to project generally perpendicularly outward from the peripheral wall of the drum body. The outer end of each blade 30 includes an end portion which is tapered so as to be reduced in thickness towards a cutting edge 32 at the outer end of the blade.

Each blade 30 is supported for readily releasable attachment to the drum body by a respective mounting flange 34. The mounting flanges protrude radially outward from the outer peripheral wall of the drum body at evenly spaced positions in the circumferential direction. The mounting flanges 34 also span axially along the full length of each roller. The height of the mounting flanges in the radial direction as measured from the outer peripheral surface of the drum body corresponds approximately to half the height of the blades such that when mounting each blade on a respective mounting flange, the blade protrudes radially outward beyond the outer end of the respective mounting flange.

Each mounting flange 34 is fixed to the peripheral surface of the drum body at both the leading face and the trailing face thereof. At the trailing face, a rear weld bead 36 joins the inner end of each mounting flange to the outer peripheral surface of the drum body continuously across the full width of the mounting flange in the lateral or axial direction. At the leading face, a plurality of separate front weld beads 38 join the inner end of each mounting flange to the outer peripheral surface of the drum at axially spaced apart weld locations along the mounting flange. The front and rear weld beads are spaced apart by the thickness of the plate forming the mounting flange so as to provide suitable support to the mounting flange to resist bending forwardly or reardwardly against the outer peripheral surface of the drum body.

Each blade 30 is secured to the front or leading face of the respective mounting flange 34 such that the blade is parallel and directly abutted against the leading face of the mounting flange. A plurality of bolts 39 are received through cooperating apertures 40 at axially spaced apart positions along each of the mounting flange 34 and the blade 34 alignment with one another in the mounted position of the blade. Each bolt 39 is thus received through one aperture in the blade and one aperture in the mounting flange such that the head of the bolt is abutted against the leading face of the blade so that a nut can be secured to the threaded shaft portion of the bolt protruding from the trailing face of the mounting flange. Each bolt 39 is associated with a respective front weld bead 38 at the front side of the mounting flange so as to be generally centred in the axial direction relative to the associated weld bead.

To isolate the bolts 39 from shear forces, each blade includes a plurality of support members 42 associated therewith against which the inner end of the blade is abutted in the mounted position of the blade on the drum body. The support members 42 comprises sections of square steel bar which are mounted co-linearly with one another at axially spaced apart positions along the length of the associated blade. More particularly the support members are abutted against the leading face of the associated mounting flange 34 such that each support member 34 extends an axial distance between two respective front weld beads 38. Similarly each front weld bead 38 in turn spans axially between two adjacent ones of the spaced apart support members 42 of the associated blade. Each support member is secured to the outer peripheral surface of the drum by a corresponding weld bead 44 along the front side thereof.

In this manner, the square cross-section of each support member includes an inner side abutted directly against the outer peripheral surface of the drum, a trailing side abutted directly against the leading face of the mounting flange, and an outer side which defines a seating surface 46 which is parallel to and spaced radially outward in relation to a corresponding portion of the outer peripheral surface of the drum. More particularly each seating surface 46 is oriented tangentially to the peripheral surface of the drum body so as to be perpendicular to the radially spanning associated blade as well as being perpendicular to the leading face of the mounting flange associated therewith.

In use, each mounting flange 34 is fixed to the outer peripheral surface of the drum body by a continuous weld bead along the rear side thereof and spaced apart weld beads along the front side thereof. The front weld beads 38 locate respective ones of the support members 42 therebetween. Accordingly each blade is supported by a plurality of axially spaced apart seating surfaces against which the inner end of the blade is abutted when the apertures in the blade are aligned with corresponding apertures in the mounting flange. The bolts are used to maintain the blade in fixed relation against the leading face of the mounting flange such that the seating surfaces isolate the bolts from shear forces on the bolts resulting from the radially inward impact forces of the blades contacting the ground during rolling motion of the land roller across the ground. By providing seating surfaces which are raised radially outwardly in relation to the outer peripheral surface of the drum body, the mounting flange can still be welded by a suitable weld bead at the leading face thereof at axially spaced apart positions between the support members so that full support can be provided to the blades to isolate the bolts from shear forces even when the mounting flanges are devoid of any rear brace structures because the raised seating surfaces provide space for the front weld beads 38.

In the event that any one of the blades becomes damaged, for example by being chipped or dented from contact with rocks or other debris, or when periodic maintenance of the blades is required for example for sharpening, one or more of the blades can be readily separated from the drum body by removing the threaded bolts supporting that blade to the respective mounting flange.

In the illustrated embodiment, each support member 42 is a square stock bar which has cross-sectional dimensions of 0.5 inches by 0.5 inches, and a length of approximately 4 inches. Each front weld bead 38 also spaced a distance of approximately 4 inches in the axial direction. The bolt apertures within each blade are thus spaced apart by approximately 8 inches. The blades and mounting flanges are each approximately 0.5 inches thick. Radial height of the mounting flanges may be near 3 inches whereas the radial height of the blades may be near 5 to 6 inches to protrude outwardly beyond the mounting flanges by a few inches. In further embodiments however, many variations to the noted dimensions are possible within the scope of the present invention.

Furthermore, although a single mounting flange is associated with each blade in the illustrated embodiment, in further embodiments multiple separate mounting flanges may be fixed to the peripheral surface of the drum at axially spaced apart positions along each blade.

Similarly, in further embodiments, the blades may be provided in sections which extend only part of the length of the roller in the axial direction.

Since various modifications can be made in my invention as herein above described, it is intended that all matter contained in the accompanying specification shall be interpreted as illustrative only and not in a limiting sense.

The invention claimed is:

1. A ground roller for being supported on a land roller implement for chopping vegetation on the ground, the land roller implement having a main frame arranged for connection to a towing vehicle for movement in a forward working direction with the towing vehicle, the ground roller comprising:
    a drum body having an outer periphery which is generally cylindrical about a drum axis and being arranged to be supported on the main frame for rotation relative to the main frame about the drum axis in which the drum axis is oriented transversely to the forward working direction for rolling movement across the ground in the forward working direction;
    a plurality of mounting flanges supported on the drum body so as to extend generally in an axial direction of the ground roller, each mounting flange having a mounting face oriented to extend generally radially outward from the outer periphery of the drum body;
    a plurality of blades supported on the mounting flanges in parallel abutment against the mounting faces of the mounting flanges respectively such that each blade extends radially outwardly from an inner edge to an outer edge which is spaced radially outwardly in relation to the respective mounting flange; and
    a plurality of seating surfaces fixedly supported in relation to the drum body in association with each blade at a location spaced radially outwardly from the outer periphery of the drum body;
    the seating surfaces receiving the inner edge of the associated blade abutted thereon; and
    the seating surfaces being oriented perpendicularly to the mounting face of the mounting flange or the mounting flanges associated therewith;
    wherein a leading face of at least some of the mounting flanges are welded to a peripheral surface of the drum body at a plurality of axially spaced apart weld locations; and
    wherein some of the seating surfaces are located at seat locations which are between respective ones of the weld locations in an axial direction of the drum body.

2. The ground roller according to claim 1 wherein the blades are releasably secured to the mounting flanges by threaded fasteners and the threaded fasteners are isolated from shear forces by abutment of the blades with the seating surfaces.

3. The ground roller according to claim 1 wherein the mounting faces of the mounting flanges upon which the blades are supported are the leading faces of the respective mounting flanges.

4. The ground roller according to claim 1 wherein each seating surface is located on a support member mounted onto a corresponding portion of a peripheral surface of the drum body and wherein each seating surface is oriented parallel to said corresponding portion of the peripheral surface of the drum body.

5. The ground roller according to claim 1 wherein each seating surface is oriented perpendicularly to a radial direction that the associated blade extends from the inner edge to the outer edge of the associated blade.

6. The ground roller according to claim 1 wherein each blade is abutted against a plurality of the seating surfaces at axially spaced apart positions along the drum body.

7. The ground roller according to claim 1 wherein at least some of the mounting flanges supporting the blades thereon are welded to a peripheral surface of the drum body at the leading face and at a trailing face of the mounting flange.

8. A ground roller for being supported on a land roller implement for chopping vegetation on the ground, the land roller implement having a main frame arranged for connection to a towing vehicle for movement in a forward working direction with the towing vehicle, the ground roller comprising:
- a drum body having an outer periphery which is generally cylindrical about the drum axis;
- a plurality of mounting flanges supported on the drum body so as to extend generally in an axial direction of the ground roller and so as to protrude generally radially outward from the outer periphery of the drum body;
- a leading face of each of the mounting flanges being welded to a peripheral surface of the drum body at a plurality of axially spaced apart weld locations;
- a plurality of blades supported on the mounting flanges respectively such that each blade extends radially outwardly from an inner edge to an outer edge which is spaced radially outwardly in relation to the respective mounting flange; and
- a plurality of seating surfaces fixedly supported in relation to the drum body at axially spaced apart positions along the drum body in association with each mounting flange so as to be oriented transversely to the associated blade at a location spaced radially outwardly from the outer periphery of the drum body;
- the seating surfaces in association with each mounting flange receiving the inner edge of the associated blade abutted thereon; and
- some of the seating surfaces being located at seat locations which are between respective ones of the weld locations of the associated mounting flange in an axial direction of the drum body.

9. The ground roller according to claim 8 wherein the blades are releasably secured to the mounting flanges by threaded fasteners and the threaded fasteners are isolated from shear forces by abutment of the blades with the seating surfaces.

10. The ground roller according to claim 8 wherein each mounting flange has a leading face oriented to extend radially outwardly from the outer periphery of the drum body and wherein the blades are supported in parallel abutment against the leading faces of the respective mounting flanges.

11. The ground roller according to claim 8 wherein each seating surface is located on a support member mounted onto a corresponding portion of a peripheral surface of the drum body and wherein each seating surface is oriented parallel to said corresponding portion of the peripheral surface of the drum body.

12. The ground roller according to claim 8 wherein each seating surface is oriented perpendicularly to a radial direction that the associated blade extends from the inner edge to the outer edge of the associated blade.

13. The ground roller according to claim 8 wherein each mounting flange has a mounting face oriented to extend radially outwardly from the outer periphery of the drum body, wherein the blades are supported in parallel abutment against the mounting faces of the respective mounting flanges, and wherein each seating surface is oriented perpendicularly to the mounting face of the mounting flange or the mounting flanges associated therewith.

14. The ground roller according to claim 8 wherein at least some of the mounting flanges supporting the blades thereon are welded to a peripheral surface of the drum body at a leading face and at a trailing face of the mounting flange.

* * * * *